(12) United States Patent
Chien et al.

(10) Patent No.: US 9,335,947 B2
(45) Date of Patent: May 10, 2016

(54) INTER-PROCESSOR MEMORY

(71) Applicant: Raytheon Company, Waltham, MA (US)

(72) Inventors: Pen C. Chien, Walnut, CA (US); Frank N. Cheung, Agoura Hills, CA (US); Kuan Y. Huang, West Hills, CA (US)

(73) Assignee: RAYTHEON COMPANY, Waltham, MA (US)

( * ) Notice: Subject to any disclaimer, the term of this patent is extended or adjusted under 35 U.S.C. 154(b) by 138 days.

(21) Appl. No.: 14/318,874

(22) Filed: Jun. 30, 2014

(65) Prior Publication Data

US 2015/0378639 A1    Dec. 31, 2015

(51) Int. Cl.
*G06F 13/00*    (2006.01)
*G06F 3/06*    (2006.01)

(52) U.S. Cl.
CPC ............ *G06F 3/0647* (2013.01); *G06F 3/0604* (2013.01); *G06F 3/0673* (2013.01)

(58) Field of Classification Search
CPC .... G06F 3/0604; G06F 3/0647; G06F 3/0673
See application file for complete search history.

(56) References Cited

U.S. PATENT DOCUMENTS

| 7,367,836 | B2 | 5/2008 | Wong et al. | |
|---|---|---|---|---|
| 2004/0088489 | A1* | 5/2004 | Hironaka | G06F 9/3802 711/131 |
| 2010/0131738 | A1* | 5/2010 | Kobori | G06F 15/17381 712/19 |
| 2012/0159244 | A1* | 6/2012 | Hirao | G06F 11/1441 714/15 |

FOREIGN PATENT DOCUMENTS

EP        2228729 A1    9/2010

* cited by examiner

*Primary Examiner* — Yong Choe
(74) *Attorney, Agent, or Firm* — Cantor Colburn LLP (57) ABSTRACT

Embodiments relate to an inter-processor memory. An aspect includes a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory. Another aspect includes each memory bank corresponding to a single respective read port of the inter-processor memory, and wherein, within each memory bank, each memory module of the plurality of parallel memory modules is writable in parallel by a single respective write port of the inter-processor memory.

20 Claims, 8 Drawing Sheets

INTER-PROCESSOR MEMORY

STATEMENT REGARDING FEDERALLY SPONSORED RESEARCH OR DEVELOPMENT

This invention was made with government support under Prime Contract Number FA8651-12-D-0106 awarded by the Air Force Research Laboratory. The government has certain rights in the invention.

BACKGROUND

The present disclosure relates to computer systems, and more particularly to an inter-processor memory for a multi-processor computer system.

A computing system may include multiple processing devices, each of which may run one or more processes simultaneously. In order to share data between these processes, an inter-processor memory is necessary. Inter-processor information exchange via an inter-processor memory may require relatively high resources in the computing system. There are various types of inter-processor memory available. An inter-processor memory that is implemented as a register array may handle multiple write and read accesses per clock cycle; however, relatively complex control logic may be necessary for the register array. While writes from a process to the inter-processor memory are immediately available to all other processes in a register array inter-processor memory, the physical size necessary for the memory registers and the control logic for such a memory may not be feasible in some computing systems. Other, more resource-conscious approaches sacrifice performance of the inter-processor memory. An inter-processor memory may be implemented as a shared memory with arbitration, which may have a relatively small size, but relatively low performance, as updates to the memory may not be available to all processes at the same time. Other examples of inter-processor memory are a bi-directional first-in-first-out (FIFO) scheme, or as a memory cluster with a crossbar. However, in these memory schemes, there may be a delay before updates from a process are available to other processes.

SUMMARY

According to one embodiment, an inter-processor memory includes a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory, wherein each memory bank corresponds to a single respective read port of the inter-processor memory, and wherein, within each memory bank, each memory module of the plurality of parallel memory modules is writable in parallel by a single respective write port of the inter-processor memory.

According to another embodiment, a method of performing a write operation in an inter-processor memory includes receiving a write address and write data corresponding to a write operation on a write port of the inter-processor memory, the inter-processor memory comprising a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory, wherein, within each memory bank, each memory module of the plurality of parallel memory modules is writable in parallel by a single respective write port of the inter-processor memory; and writing the write data into a memory location associated with the write address in a single memory module in each of the memory banks in parallel.

According to another embodiment, a method of performing a read operation in an inter-processor memory includes receiving a read address on a read port of the inter-processor memory, the inter-processor memory comprising a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory, wherein each memory bank corresponds to a single respective read port of the inter-processor memory; and reading data from a memory location associated with the read address from each of the parallel memory modules in the memory bank associated with the read port.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Embodiments of an inter-processor memory are provided, with exemplary embodiments being discussed in below in detail. The inter-processor memory comprises a plurality of memory banks, each memory bank comprising one or more dual-ported (i.e., read port and write port) memories, such as dual-port random access memory (DPRAM) modules, arranged in parallel. Each memory bank comprises the same number of parallel DPRAM modules. Each memory bank of the inter-processor memory corresponds to a single respective read port of the inter-processor memory. Each write port of the inter-processor memory corresponds to a single DPRAIVI module within each memory bank; i.e., there is one DPRAIVI module corresponding to each write port in each memory bank. The inter-processor memory has a number of read ports (i.e., the number of reads that may be performed by the inter-processor memory simultaneously) and a number of write ports (i.e., the number of writes that may be performed by the inter-processor memory simultaneously) that are independent of the dual ports of the individual DPRAM modules. Any appropriate number of processors may be connected to the various read and write ports of an inter-processor memory. In various embodiments, the read and write ports of the inter-processor memory may be fully or partially operational at any time without affecting the function or bandwidth of the inter-processor memory.

The DPRAIVI modules within each memory bank are managed using a data pointer; each memory bank may be associated with a respective data pointer module. Each DPRAIVI module in a memory bank may comprises the same number of memory locations in some embodiments. In such embodiments, each memory location in each DPRAM module is associated with a respective entry, or write port identifier, in the data pointer. In other embodiments, the DPRAIVI modules in a memory bank may comprise different numbers of memory locations. In such embodiments, each memory location in the smallest DPRAIVI module in the memory bank is associated with a respective entry, or write port identifier, in the data pointer. When a write operation is received on a particular write port of the plurality of write ports for a particular memory location in the inter-processor memory, the write data for the write operation is written into the particular memory location in the DPRAIVI module corresponding to that write port in each of the memory banks in parallel. The respective write port identifiers in the respective data pointers for the memory location are also updated to reflect which write port made the most recent write to the particular memory location. The data pointer also resolves write collisions (i.e. multiple write ports writing to the same memory location simultaneously) by tracking a write priority, which indicates which write port has ownership of each memory location when a write collision condition occurs. The write port identifiers are updated with the identity of the active write port having the highest write priority in the event of a write collision. When a read operation for a particular memory location is received on a particular read port of the plurality of read ports of the inter-processor memory, the read operation is applied to all the memory modules in the particular memory bank. The write port identifier in the data pointer for the particular memory location determines which DPRAM module in the memory bank holds the most recently written data for the memory location. The data for the particular read operation is read out of the determined DPRAM module in the memory bank corresponding to the read port.

Figure 1:
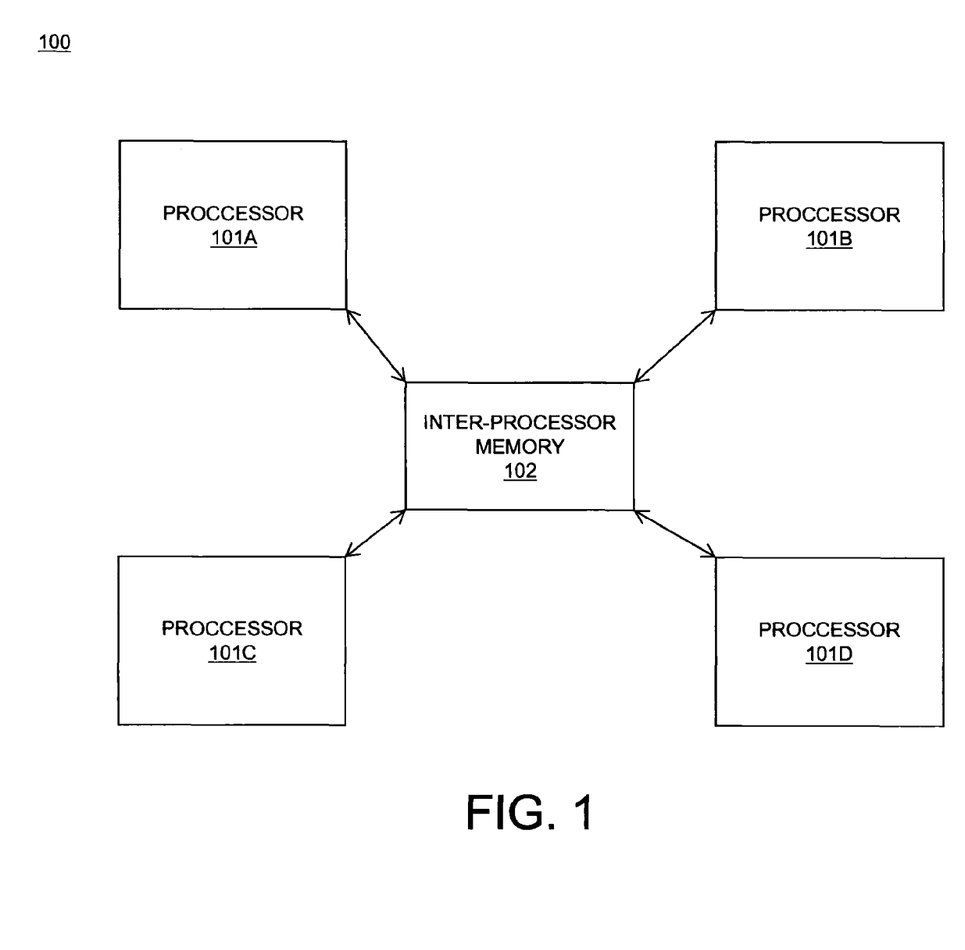
FIG. 1 illustrates a block diagram of an embodiment of a multi-processor system.

FIG. 1 illustrates a block diagram of an embodiment of a multi-processor system 100. Multi-processor system 100 includes a plurality of processors 101a-d, each in communication with an inter-processor memory 102. Each of processors 101a-d may write to and read from inter-processor memory 102 in order to share information between processes that are executing on the processors 101a-d. FIG. 1 is shown for illustrative purposes only; multi-processor system 100 may include any appropriate number of processors in communication with an inter-processor memory 102. In the embodiment of FIG. 1, each of processors 101a-d corresponds to a respective write port and a respective read port of the inter-processor memory 102. Therefore, inter-processor memory 102 comprises 4 write ports and 4 read ports as shown in FIG. 1. However, this is shown for illustrative purposes only. Embodiments of an inter-processor memory may comprise any appropriate number of read ports and any appropriate number of write ports, and the number of read ports and the number of write ports may be different. The read and write ports of an inter-processor memory may be connected to the processors of a multi-processor system in any appropriate manner.

Figure 2:
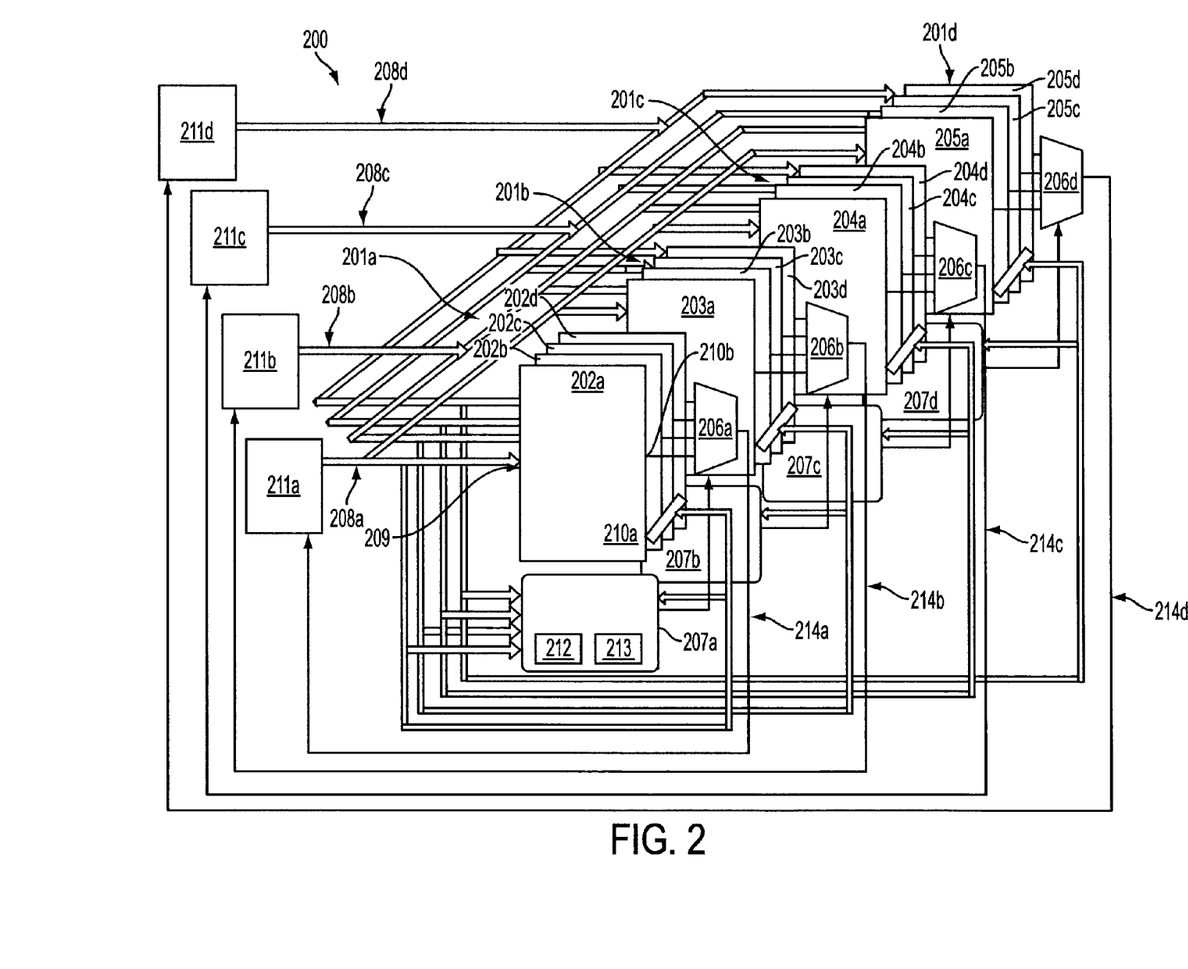
FIG. 2 illustrates a block diagram of an embodiment of an inter-processor memory.

FIG. 2 illustrates an embodiment of an inter-processor memory system 200 including a plurality of processors 211a-d. Inter-processor memory system 200 may comprise inter-processor memory 102 of FIG. 1. The inter-processor memory system 200 comprises a plurality of memory banks 201a-d, and each memory bank comprises a respective plurality of parallel DPRAIVI modules 202a-d, 203a-d, 204a-d, and 205a-d. In the embodiment shown in FIG. 2, the respective read port and the respective write port for each of the processors 211a-d are connected to the inter-processor memory system 200 via a respective memory bank read outputs 214a-d and memory bank read/write inputs 208a-d. Each read port of processors 211a-d corresponds to a respective memory bank 201a-d, and each write port of processors 211a-d corresponds to a respective DPRAM module in each of memory banks 201a-d. The write port of processor 211a corresponds to DPRAIVI modules 202a, 203a, 204a, and 205a; the write port of processor 211b corresponds to DPRAM modules 202b, 203b, 204b, and 205b; the write port of processor 211c corresponds to DPRAIVI modules 202c, 203c, 204c, and 205c, and the write port of processor 211d corresponds to DPRAM modules 202d, 203d, 204d, and 205d. Each DPRAM module of DPRAM modules 202a-d, 203a-d, 204a-d, and 205a-d comprises a write input, such as write input 209 of DPRAM module 202a, a read input, such as read input 210a of DPRAM module 202a, and a read output, such as read output 210b of DPRAM module 202a. Each of DPRAIVI modules 202a-d, 203a-d, 204a-d, and 205a-d comprises the same number of memory locations in some embodiments. In other embodiments, the DPRAM modules 202a-d, 203a-d, 204a-d, and 205a-d may comprise different numbers of memory locations.

Each memory bank 201a-d corresponds to a respective data pointer 207a-d that is connected to the respective memory bank read/write input 208a-d of the memory bank 201a-d. Data pointers 207a-d each include a write priority logic 212, which resolves write collisions between processors 211a-d, and a set of write port identifiers 213. Each memory location on a single DPRAM module corresponds to a respective write port identifier within the set of write port identifiers 213 in the data pointer 207a-d of the memory bank in which the DPRAM module is located. In some embodiments in which the DPRAIVI modules in a memory bank have different sizes, the smallest DPRAIVI module in the memory bank determines the number of write port identifiers in the data pointer for the memory bank; in other embodiments, each DPRAIVI module in the memory bank is the same size. Each set of write port identifier 213, comprised of the same number of write port identifiers as the memory locations, tracks the write operations received on its respective memory bank read/write inputs 208a-d and outputs of write priority logic 212 to indicate which DPRAIVI module in the memory bank holds the most recently written data for every memory location. Each of memory banks 201a-d further corresponds to a respective read multiplexer 206a-d that is connected to the read outputs on each of the DPRAIVI modules in the read multiplexer's respective memory bank. For example, read multiplexer 206a is connected to the read data output on each of DPRAM modules 202a-d in memory bank 201a. The read multiplexers 206a-d are controlled by output from a respective data pointer 207a-d to select the DPRAIVI outputs containing the most recent written data for the read operation and to transmit read data back to the processors 211a-d via respective memory bank read outputs 214a-d in response to read operations that are received on memory bank read/write inputs 208a-d. Data pointers 207a-d are discussed below in further detail with respect to FIG. 4. Write and read operations in inter-processor memory system 200 are discussed in further detail below with respect to FIGS. 5 and 6. FIG. 2 is shown for illustrative purposes only; for example, an inter-processor memory may have any appropriate number and configuration of read and write ports, and may be connected in any appropriate manner to any appropriate number of processors. Further, the embodiment of FIG. 2 shows processors having shared read-write buses; in some embodiments, the read and write buses may be separate.

Figure 3:
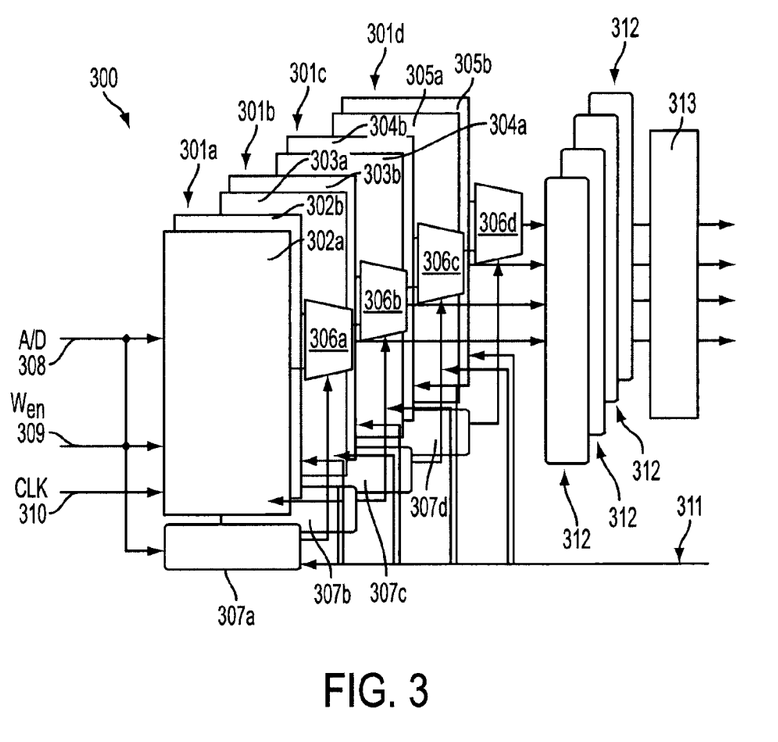
FIG. 3 illustrates a block diagram of another embodiment of an inter-processor memory.

FIG. 3 illustrates another embodiment of an inter-processor memory 300. Inter-processor memory 300 may comprise inter-processor memory 102 of FIG. 1. Inter-processor memory 300 comprises two write ports and four read ports, and therefore comprises four memory banks 301a-d with two parallel DPRAIVI modules per memory bank. Memory bank 301a comprises DPRAM modules 302a-b; memory bank 301b comprises DPRAIVI modules 303a-b; memory bank 301c comprises DPRAIVI modules 304a-b; and memory bank 301d comprises DPRAM modules 305a-b. Each of DPRAM modules 302a-b, 303a-b, 304a-b, and 305a-b comprises the same number of memory locations in some embodiments. In other embodiments, DPRAIVI modules 302a-b, 303a-b, 304a-b, and 305a-b may comprise different numbers of memory locations. Each memory location on a single DPRAM module corresponds to a respective write port identifier in the data pointer 307a-d of the memory bank in which the DPRAIVI module is located. In some embodiments in which the DPRAM modules in a memory bank have different sizes, the smallest DPRAIVI module in the memory bank determines the number of write port identifiers in the data pointer of the memory bank; in other embodiments, each DPRAM module in the memory bank is the same size. Each of memory banks 301a-d further comprises a respective read multiplexer 306a-d that is used in conjunction with respective data pointer 307a-d to perform read operations in inter-processor memory 300. Write addresses and write data for write operations are received on write inputs 308, which are each connected to respective write input on each of the DPRAM modules of DPRAM modules 302a-b, 303a-b, 304a-b, and 305a-b. The write addresses signals are also received by respective data pointers 307a-d. Write enable signals are received by the various DPRAIVI modules 302a-b, 303a-b, 304a-b, and 305a-b on write enable inputs 309, as well as by respective data pointers 307a-d. A common clock signal is received by all of DPRAM modules 302a-b, 303a-b, 304a-b, and 305a-b on clock inputs 310, as well as by data pointers 307a-d. Data pointers 307a-d each stores a write port identifier for each memory location corresponding to the most recent write to the memory location; these write port identifiers are used to select which DPRAIVI module to read data from for read operations. Data pointers 307a-d each further comprise a priority logic for resolving write collisions. There are four read address buses in read inputs 311. Each read address bus connects to a respective memory bank 301a-d and to the associated data pointer 307a-d. All of DPRAM modules 302a-b, 303a-b, 304a-b, and 305a-b in the same memory bank receive the same read address bus, and the associated data pointers 307a-d select the appropriate DPRAM module for the read operation via read multiplexers 306a-d. Read data are output from inter-processor memory 300 via read data logic 312 and read output 313. Data pointers 307a-d are discussed below in further detail with respect to FIG. 4, and write and read operations in inter-processor memory 300 are discussed in further detail below with respect to FIGS. 5 and 6. FIG. 3 is shown for illustrative purposes only; any appropriate number and configuration of processors may be in communication with the two write ports and four read ports of inter-processor memory 300. Write inputs 308, write enable inputs 309, clock input 310, read inputs 311 and read output 313 may comprise any appropriate physical configuration.

Figure 4:
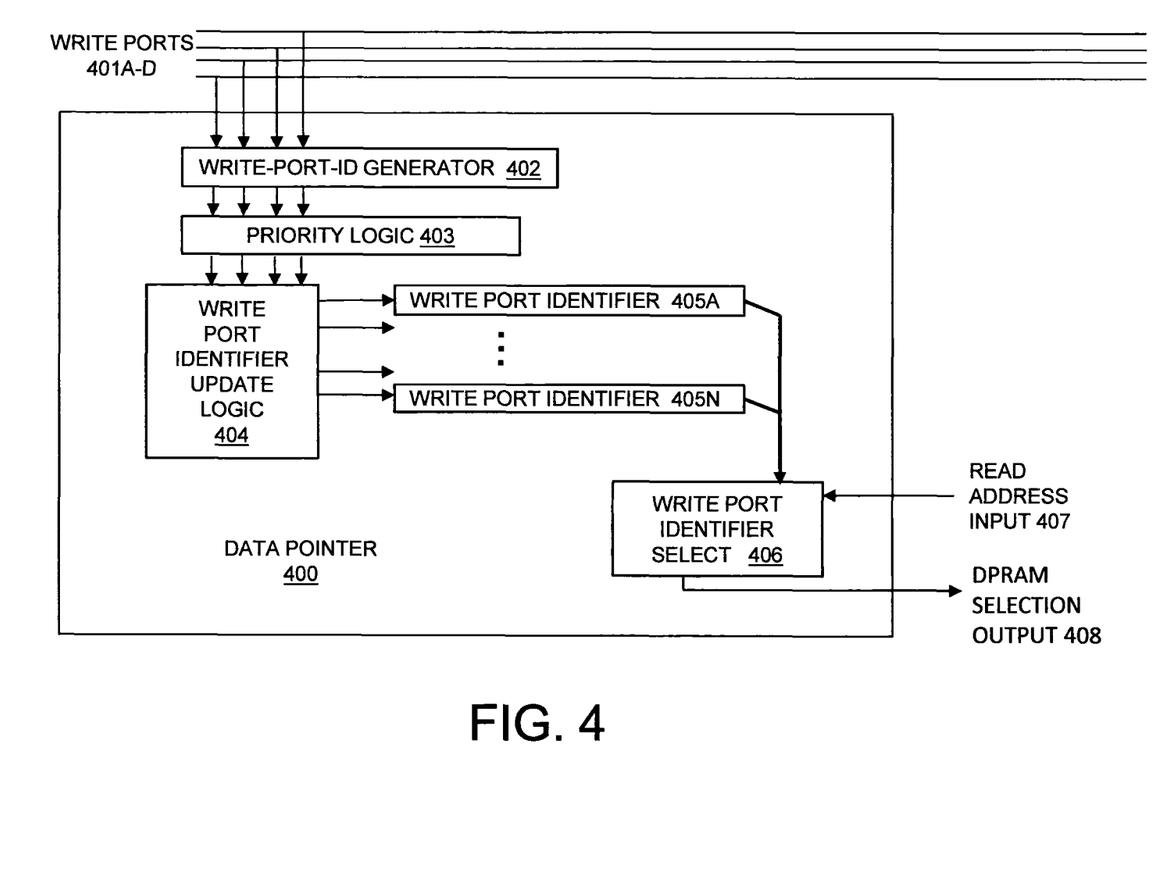
FIG. 4 illustrates a block diagram of an embodiment of a data pointer.

FIG. 4 illustrates an embodiment of a data pointer 400. Data pointer 400 may comprise each of data pointers 207a-d shown in FIG. 2, and each of data pointers 307a-d shown in FIG. 3. Data pointer 400 receives write operations on write ports 401A-D, which correspond to write ports 208a-d of FIG. 2. Data pointer 400 includes write-port-ID generator 402, priority logic 403, write port identifier update logic 404, write port identifiers 405A-N, and write port identifier select 406. Priority logic 403 corresponds to priority logic 212, and write port identifiers 405A-N correspond to the set of write port identifiers 213 of data pointer 207a, of FIG. 2. Each of write port identifiers 405A-N corresponds to write activities on one memory location of each of the DPRAM modules in the memory bank that is associated with the data pointer 400. For example, in an embodiment in which data pointer 400 comprises data pointer 207a of FIG. 2, write port identifier 405N corresponds to all write activities on memory location N of each of the DPRAM modules 202a-d in memory bank 201a. Each write port identifier 405A-N stores a write-port-ID to identify which of write ports 401A-D most recently wrote to the memory location associated with the write port identifier. For each write operation received by the inter-processor memory, the write port identifier corresponding to the write address of the write operation is updated with the corresponding write-port-ID generated by write-port-ID generator 402, to reflect the write port of the write operation via write port identifier update logic 404. If there is a collision between two or more write ports writing to the same memory location simultaneously, the collision is resolved by priority logic 403, which stores priority data that is used to determine which active write port owns each memory location when write collision condition occurs. For the write port that has ownership, the write-port-ID generated by the priority logic 403 is recorded in the write port identifier 405A-N corresponding to the memory location via write port identifier update logic 404. Read addresses corresponding to read operations that are received on the read port of the memory bank associated with data pointer 400 are received by data pointer 400 on read address input 407, and the write port that most recently wrote to the memory location corresponding to the read address, as indicated by the corresponding write port identifier 405A-N, is retrieved by write port identifier select 406 and output on DPRAM selection output 408 and used to select the DPRAM module in the memory bank that holds the most recent copy of the data for that memory location. The data for the read operation is then read from the memory location on the selected DPRAM module. All DPRAM modules in the same inter-processor memory bank that includes a data pointer such as data pointer 400 receive the same read address for a read operation; however, different banks may receive different addresses. FIG. 4 is shown for illustrative purposes only; a data pointer may be configured in any appropriate manner.

Figure 5:
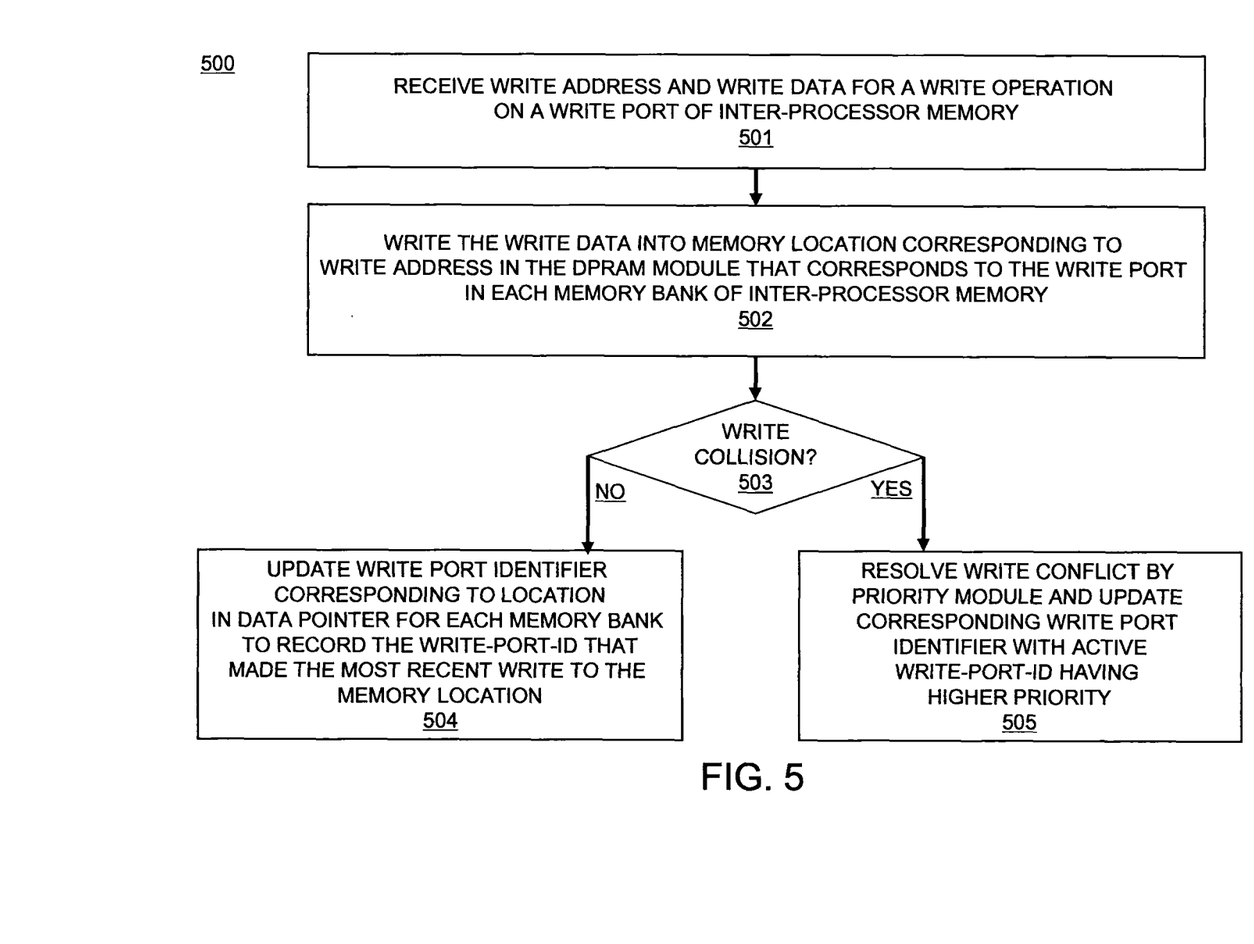
FIG. 5 illustrates a flowchart of a method of performing a write to an inter-processor memory.

FIG. 5 illustrates a flowchart of a method of processing a write in an inter-processor memory. First, in block 501, a write operation comprising a write address and write data are received on a write port by the inter-processor memory. Then, in block 502, the memory location corresponding to the write address in each of DPRAIVI modules corresponding to the write port is written with the write data. The write data is written into the same location in a single DPRAIVI module in each memory bank. Next, in block 503, it is determined whether there is a write collision; e.g., two write ports attempting to write to the same location simultaneously. If there is no write collision in block 503, then, in block 504, the write port identifier corresponding to the memory location in each of the data pointers is updated to reflect that the most recent write to the memory location was performed by the write port on which the write operation was received. If there is a write collision in block 503, flow proceeds to block 505, and the priority module in the data pointer resolves which one of the write ports that are attempting to write to the memory location has higher priority, e.g., which active write port owns the memory location. The write-port-ID of the write port that has the higher priority is inserted into the write port identifier corresponding to the memory location. Method 500 is repeated for each write in the inter-processor memory, and multiple writes to multiple memory locations may be performed in parallel (i.e., one write on each of the write ports) in an inter-processor memory using method 500.

For an example write operation performed via the write port corresponding to processor 211a in inter-processor memory system 200 of FIG. 2, the write operation, including a write enable signal, a write address, and write data, is transmitted by processor 211a via memory bank read/write input 208a in block 501. Then, in block 502, memory bank read/write input 208a transmits the write operation to each of DPRAIVI modules 202a, 203a, 204a, and 205a in memory banks 201a-d, and the write data is written into the memory location specified by the write address in each of the DPRAIVI modules 202a, 203a, 204a, and 205a via write inputs such as write input 209 of DPRAM module 202a. In block 503, the write port identifiers 213 in each of data pointers 207a-d are updated to indicate that the memory location corresponding to the write address was most recently written by the write port of processor 211a. If there is a collision between, for example, processor 211a and processor 211b writing to the same memory location simultaneously, priority logic 212 determines which write-port-ID (either 208a or 208b) should be recorded into the write port identifier 213 corresponding to the memory location. In such a collision, processor 211a writes its write data to the memory location associated with the write address in each of its associated DPRAIVI modules 202a, 203a, 204a, and 205a, and processor 211b also writes its write data to the memory location associated with the write address in each of its associated DPRAIVI modules 202b, 203b, 204b, and 205b.

Figure 6:
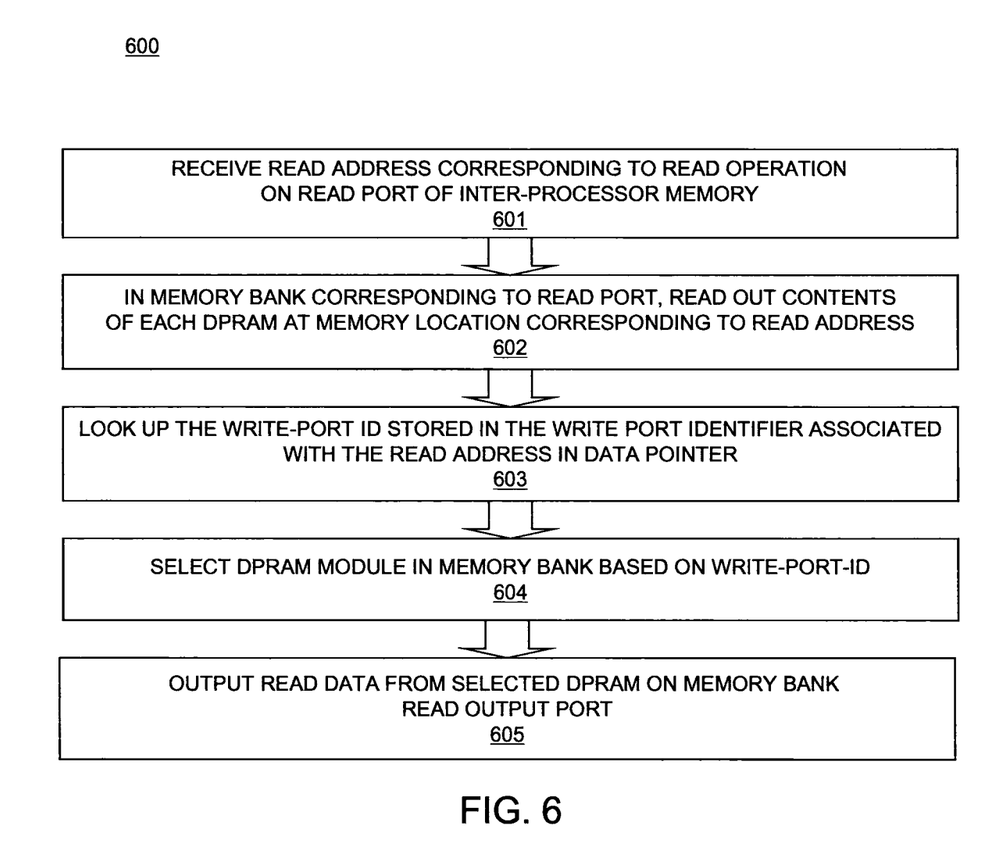
FIG. 6 illustrates a flowchart of a method of performing a read from an inter-processor memory.

FIG. 6 illustrates a flowchart of a method of performing a read from an inter-processor memory. First, in block 601, a read operation comprising a read address is received on a read port of the inter-processor memory. Then, in block 602, the data in the memory location corresponding to the read address is read out of each of the DPRAM modules in the memory bank corresponding to the read port. In block 603, data pointer determines which write port most recently wrote to the memory read location based on the write-port-ID stored in the write port identifier corresponding to the read address. In block 604, a DPRAIVI module in the memory bank is selected based on the write-port-ID that was determined in block 603, and, in block 605, the read data from the selected DPRAM module is output via the memory bank read output port. Method 600 is repeated for each read in the inter-processor memory, and multiple reads from multiple memory locations may be performed in parallel (i.e., one read on each of the read ports) in an inter-processor memory using method 600.

For an example read operation performed by processor 211a in inter-processor memory system 200 of FIG. 2, first, in block 601, a read operation, including a read enable signal and a read address, is transmitted by processor 211a via memory bank read/write input 208a. Read commands from processor 211a are performed using memory bank 201a that corresponds to the read port of processor 211a. In block 602, the read address is transmitted to each of DPRAM modules 202a-d in memory bank 201a via read inputs 210a, and the data at the memory location corresponding to the read address in each of DPRAIVI modules 202a-d is output to the read multiplexer 206a via the DPRAM modules read outputs. In block 603, the read address is transmitted to the data pointer 207a, data pointer 207a determines which memory bank read/write input 208a-d most recently wrote to the read location based on the write-port-ID stored in the write port identifier corresponding to the read inputs 210a. In block 604, one of the DPRAM modules of DPRAM modules 202a-d is selected by the read multiplexer 206a based on the write-port-ID stored in the write port identifier for the memory read location inside the data pointer 207a, and, in block 605, the read data from the selected DPRAIVI module is provided to processor 211a via memory bank read output 214a. For example, if the write port identifier indicates that processor 211b most recently wrote to the memory location corresponding to the read address, DPRAM module 202b would be selected in block 604, and the read data from DPRAM module 202b would be output in block 605.

Figure 7:
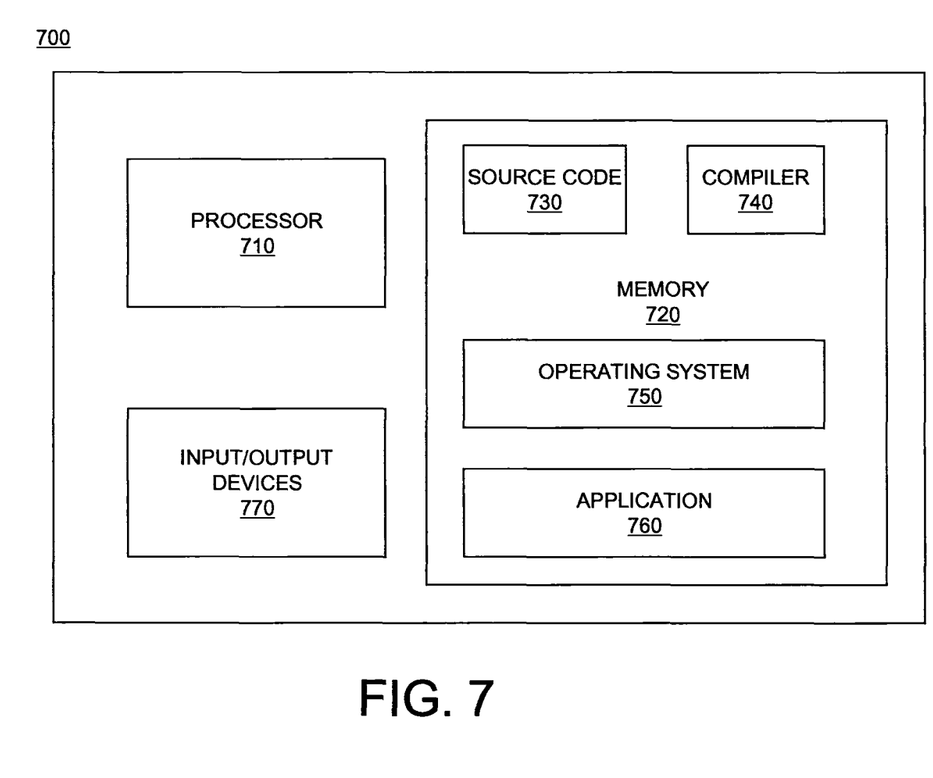
FIG. 7 illustrates a block diagram of an embodiment of a computer that may be used in conjunction with embodiments of an inter-processor memory.

FIG. 7 illustrates an example of a computer 700 which may be used in conjunction with embodiments of an inter-processor memory. Various operations discussed above may utilize the capabilities of the computer 700. One or more of the capabilities of the computer 700 may be incorporated in any element, module, application, and/or component discussed herein. For example, embodiments of an inter-processor memory as describe above with respect to FIGS. 1-6 may be incorporated into processor 710.

The computer 700 includes, but is not limited to, PCs, workstations, laptops, PDAs, palm devices, servers, storages, and the like. Generally, in terms of hardware architecture, the computer 700 may include one or more processors 710, memory 720, and one or more I/O devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a digital signal processor (DSP), or an auxiliary processor among several processors associated with the computer 700, and the processor 710 may be a semiconductor based microprocessor (in the form of a microchip) or a macroprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
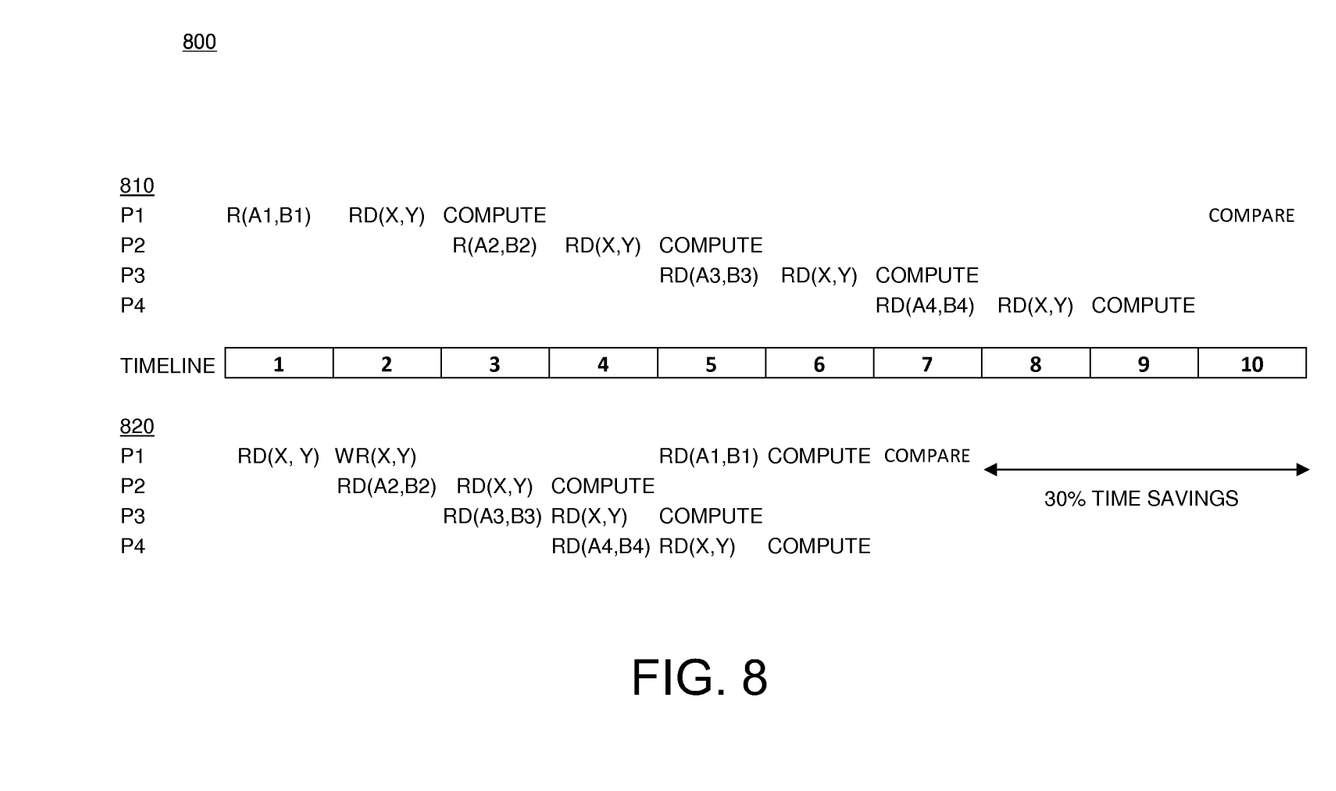
FIG. 8 illustrates an example of operation of embodiments of processors.

FIG. 8 illustrates an example 800 of operation of embodiments of processor. In FIG. 8 shows two example timelines 810 and 820 of processor operation for a 4 core processor performing a task in which 4 processors P1-P4 each compute the equation $Ai*X+Bi*Y$, then compare the results of the computations. Fetching of parameters Ai, Bi, X, and Y by processors P1-P4 is limited in that only one processor can occupy the data fetch bus at a time, and only two parameters may be fetched per time slice. Full parameter fetching bandwidth is used in both 810 and 820 timelines shown in FIG. 8. Example timeline 810 is based on a prior art processor, and example timeline 820 is based on a processor comprising an inter-processor memory as described above with respect to FIGS. 1-6. In example timeline 810, processor P1 reads A1 and B1 in time slice 1, reads X and Y in time slice 2, and computes A1*X+B1*Y in time slice 3. Processor P2 reads A2 and B2 in time slice 3, reads X and Y in time slice 4, and computes A2*X+B2*Y in time slice 5. Processor P3 reads A3 and B3 in time slice 5, reads X and Y in time slice 6, and computes A3*X+B3*Y in time slice 7. Processor P4 reads A4 and B4 in time slice 7, reads X and Y in time slice 8, and computes A4*X+B4*Y in time slice 9. The computation results for all 4 processors P1-P4 are then compared in time slice 10. In example timeline 820, P1 fetches X and Y in time slice 1, and, in time slice 2, writes X and Y to the inter-processor memory for use by the other processors P2-P4. X and Y are therefore available to all of the processors P2-P4 via the inter-processor memory after time slice 2. Processor P2 reads A2 and B2 in time slice 2, reads X and Y from the inter-processor memory in time slice 3, and computes A2*X+B2*Y in time slice 4. Processor P3 reads A3 and B3 in time slice 3, reads X and Y from the inter-processor memory in time slice 4, and computes A3*X+B3*Y in time slice 5. Processor P4 reads A4 and B4 in time slice 4, reads X and Y from the inter-processor memory in time slice 5, and computes A4*X+B4*Y in time slice 6. Processor P1 reads A1 and B1 in time slice 5, and computes A1*X+B1*Y in time slice 6. The computation results for all 4 processors P1-P4 are then compared in time slice 7, representing a time savings of approximately 30% for the task as compared to timeline 810.

The technical effects and benefits of exemplary embodiments include a relatively small and relatively fast inter-processor memory for use in a computing system.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An inter-processor memory, comprising:
   a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory;
   wherein each memory bank corresponds to a single respective read port of the inter-processor memory, and wherein, within each memory bank, each memory module of the plurality of parallel memory modules is writable in parallel by a single respective write port of the inter-processor memory.

2. The inter-processor memory of claim 1, wherein the plurality of parallel memory modules each comprise dual-port random access memory (DPRAM) modules.

3. The inter-processor memory of claim 1, wherein each memory bank further comprises a respective data pointer, the data pointer comprising a plurality of write port identifiers storing write-port-IDs corresponding to the memory modules in the memory bank.

4. The inter-processor memory of claim 3, wherein a write-port-ID in a write port identifier indicates a write port that most recently wrote to a memory location associated with the write port identifier.

5. The inter-processor memory of claim 3, the data pointer further comprising a priority logic that determines, based on a write collision, a write-port-ID to insert into a write port identifier associated with a memory location in which the write collision occurred.

6. The inter-processor memory of claim 1, wherein performing a write operation in the inter-processor memory comprises:
   receiving a write address and write data corresponding to a write operation on a write port of the inter-processor memory; and
   writing the write data into a memory location associated with the write address in a single memory module in each of the memory banks in parallel.

7. The inter-processor memory of claim 6, further comprising:
   inserting a write-port-ID of the write port into a write port identifier associated with the write address and priority logic.

8. The inter-processor memory of claim 1, wherein performing a read operation in the inter-processor memory comprises:
   receiving a read address on a read port of the inter-processor memory; and
   reading data from a memory location associated with the read address from each of the parallel memory modules in the memory bank associated with the read port.

9. The inter-processor memory of claim 8, further comprising:
   selecting a memory module in the memory bank based on a write-port-ID that is stored in a write port identifier associated with the read address; and
   outputting read data from the selected memory module onto the read port of the inter-processor memory.

10. A method of performing a write operation in an inter-processor memory, comprising:
    receiving a write address and write data corresponding to a write operation on a write port of the inter-processor memory, the inter-processor memory comprising a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory, wherein, within each memory bank, each memory module of the plurality of parallel memory modules is writable in parallel by a single respective write port of the inter-processor memory; and writing the write data into a memory location associated with the write address in a single memory module in each of the memory banks in parallel.

11. The method of claim 10, further comprising, based on the write operation, inserting a write-port-ID of the write port into a write port identifier associated with the memory location in a data pointer.

12. The method of claim 11, wherein the write-port-ID in the write port identifier indicates a write port that most recently wrote to a memory location associated with the write port identifier.

13. The method of claim 11, further comprising determining, by a priority logic of the data pointer, based on a write collision associated with the write operation, a write-port-ID to insert into a write port identifier associated with a memory location in which the write collision occurred.

14. The method of claim 10, wherein each memory bank corresponds to a single respective read port of the inter-processor memory, and wherein performing a read operation in the inter-processor memory comprises:
receiving a read address on a read port of the inter-processor memory; and
reading data from a memory location associated with the read address from each of the parallel memory modules in the memory bank associated with the read port.

15. The method of claim 14, further comprising:
selecting a memory module in the memory bank based on a write-port-ID that is stored in a write port identifier associated with the read address; and
outputting read data from the selected memory module on the read port.

16. A method of performing a read operation in an inter-processor memory, comprising:
receiving a read address on a read port of the inter-processor memory, the inter-processor memory comprising a plurality of memory banks, each of the plurality of memory banks comprising a respective plurality of parallel memory modules, wherein a number of the plurality of memory banks is equal to a number of read ports of the inter-processor memory, and a number of parallel memory modules within a memory bank is equal to a number of write ports of the inter-processor memory, wherein each memory bank corresponds to a single respective read port of the inter-processor memory; and
reading data from a memory location associated with the read address from each of the parallel memory modules in the memory bank associated with the read port.

17. The method of claim 16, further comprising, based on the write operation, inserting a write-port-ID of the write port into a write port identifier associated with the memory location in a data pointer.

18. The method of claim 17, further comprising determining by a priority logic of the data pointer, based on a write collision associated with the write operation, a write-port-ID to insert into a write port identifier associated with a memory location in which the write collision occurred.

19. The method of claim 16, wherein, within each memory bank, each memory module of the plurality of parallel memory modules is writable by a single respective write port of the inter-processor memory, and wherein performing a write operation in the inter-processor memory comprises:
receiving a write address and write data corresponding to a write operation on a write port of the inter-processor memory; and
writing the write data into a memory location associated with the write address in a single memory module in each of the memory banks in parallel.

20. The method of claim 16, further comprising:
selecting a memory module in the memory bank based on a write-port-ID that is stored in a write port identifier associated with the read address; and
outputting read data from the selected memory module on the read port.

\* \* \* \* \*